(No Model.)
G. W. DUDLEY.
Rotary Engine.
No. 236,007.  Patented Dec. 28, 1880.
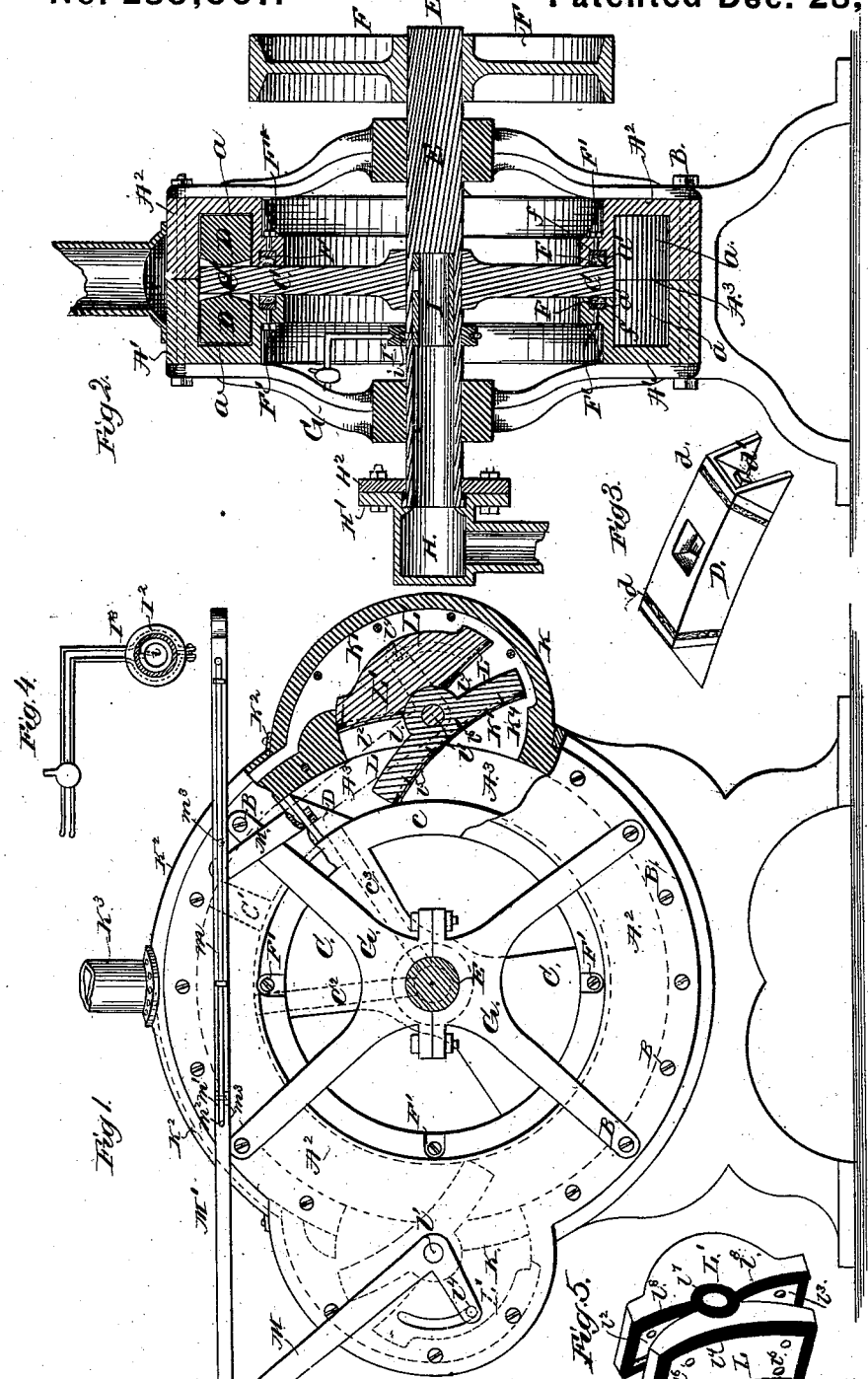
WITNESSES:
INVENTOR:
G. W. Dudley
BY
ATTORNEYS.

United States Patent Office.

GEORGE W. DUDLEY, OF WAYNESBOROUGH, VIRGINIA.

ROTARY ENGINE.

SPECIFICATION forming part of Letters Patent No. 236,007, dated December 28, 1880.

Application filed May 25, 1880. (No model.)

*To all whom it may concern:*

Be it known that I, GEORGE W. DUDLEY, of Waynesborough, in the county of Augusta and State of Virginia, have invented a new and Improved Rotary Engine; and I do hereby declare that the following is a full, clear, and exact description of the same.

The object of my invention is to construct an engine upon the rotary principle which will be of the most simple form and will dispense entirely with the use of valves and sliding abutments that are operated by mechanism from the driving-shaft of the engine by cams, eccentrics, &c., as such mechanism is at all times liable to derangement from constant wear and adds greatly to the original cost of the machine; and the improvement consists, first, in a rotary engine having an annular steam-chamber, through which a segmental piston rotates through suitable connections upon a shaft concentric with the steam-chamber, the arms connecting the piston and steam-chamber being provided with ports through which the steam passes to the chamber at all times immediately behind the piston, in combination with an exhaust-valve arranged in a chamber upon the outer side of the steam-chamber in such manner that one end of the valve will be projected across the steam-chamber to form an abutment for the steam behind the piston, and the outer end of the valve will extend back into the valve-chamber which communicates with the open air and provide an escape for the exhaust, the valve being momentarily closed by the piston in passing and reopened solely by the pressure of the exhaust; second, in a casing provided with an annular chamber through which a segmental piston is caused to travel, in combination with segmental valves pivoted to the casing and arranged diametrically opposite each other to swing across the chamber by the pressure of the exhaust-steam in its effort to escape and close the chamber behind the piston immediately after it has passed the valve, the valves being arranged to operate in reverse directions, so that while one half of the annular chamber is under steam-pressure the other half is being exhausted; third, in providing a piston arranged to rotate in an annular chamber and operate in connection with valves in the above-described manner, the piston being connected with a hollow shaft by radial ports that connect the interior of the shaft with the annular chamber upon opposite sides of the piston, and the valves being hinged to oscillating valve-seats coupled together and arranged to operate in connection with the valves, so that the positions and operation of the valves may be reversed, by which means the engine may be caused to rotate in either direction.

My invention next consists in an improved construction and arrangement of parts by which suitable means may be employed for packing the steam-chamber, piston, and valves.

The invention further consists in an improved mode of connecting a segmental piston rotating in an annular chamber with the driving-shaft, that the piston may adjust itself and travel smoothly through the chamber while it will fit closely within it, as will hereinafter appear.

The invention finally consists in an improved valve operated, in connection with the double radial ports, to reverse the engine, as hereinafter described.

In the accompanying drawings, Figure 1 is a side elevation of the engine, with a portion of the casing broken away to show one of the valves and its seat; Fig. 2, a vertical sectional view of the same in line *y y* of Fig. 1; Fig. 3, a perspective view of the piston detached; Fig. 4, a side elevation of the lever for operating the reverse-valve, and Fig. 5 a perspective view of the valve and valve-seat detached.

The casing A is formed of two similar ring-shaped shells, A' A², of cast metal, each with an annular recess, *a*, formed in its face, of a depth equal to one-half the width of the piston. When the sections are placed together face to face the recesses of the plates will form an annular chamber, into which the piston will snugly fit. The shells are held closely together by bolts B passing through the outer rim of the shell. The inner rims of the shells A' A² will, when so connected, come opposite each other and be at sufficient distance apart to allow a rim-plate, C, connecting the piston D to the driving-shaft E, to be interposed and fit snugly between them. A second and much smaller annular groove, *a'*, in the faces of the rims receives a ring-packing, F, preferably of rubber, held closely against the rim-plate by their elasticity and adjusted, when desired, by set-screw F' and packing-plates f, against which the ends of the set-screws bear. The piston will thus be permitted to revolve about the center of the driving-shaft in the annular chamber $A^3$ without allowing the steam to escape from the chamber A through the joints of the casing, as the rim-plate C is a circular plate and completely fills the space between the inner rims of the shell.

The piston D is formed of a rectangular block of metal curved upon its upper and lower sides to exactly fit the steam-chamber and form the segment of a metal ring. The piston is formed with an opening of peculiar shape to allow a finger-piece, C', upon the rim-plate C to pass up through it. The opening through the valve is formed with flat sides, which converge toward the center of the opening, the center of the opening being smaller than the outer portions of the opening, in order that it may fit closely around the finger and there be no lost motion between them. The flaring shape of the opening, however, will allow the valve to adjust itself upon the finger and adapt itself to follow the steam-chamber without binding upon it, notwithstanding any irregularity of surface or eccentricity of parts that may exist. The piston is packed by rectangular pieces of sheet-rubber $d$, cut to closely fit the steam-chamber, and held against the ends of the piston by screw-bolts $d'$, that pass through the rubber and into the ends of the piston. The bolts $d'$ also hold inclined plates D' against each end of the piston, which serve to open the valve gradually by raising it over its inclined surface.

The shell A is held in place concentrically to the driving-shaft E by a spider, G, made in two sections divided at its hub to encircle the shaft, and secured at its outer ends to the shell-sections by the bolts B, which hold the sections $A'$ $A^2$ of the casing together, and are themselves held together at the hub by bolts $g$ passing through their flanges. A spider, G, is arranged upon each side of the casing, and together form a firm support for both ends of the driving-shaft.

One half of the driving-shaft E is solid, and is keyed to a band-wheel, F, from which the power may be transmitted from the machine, and the other half of the shaft is hollow, and communicates at its open end with the interior of a steam-chest, H, secured to the end of the shaft by a flange, H', upon the rim of the chest, being bolted to a ring-plate, $H^2$. The end of the shaft bears against a shoulder upon the interior of the steam-chest, and the ring-plate $H^2$ bears against a collar upon the end of the shaft.

The rim-plate C is provided with radial ports $C^2$ $C^3$, which connect the interior of the hollow shaft with the steam-chamber $A^3$ at points very near to the ends of the piston D, and as the rim-plate and piston revolve together the ports will at all times follow the piston and retain their relative arrangement with it.

A cylindrical valve, I, made to fit the interior of the shaft, is provided with a single opening through it to communicate with one of the ports $C^2$ $C^3$ of the rim-plate at a time. The valve I is provided with a radial pin, $i$, that passes through a short slot in the shaft, and is attached to a grooved ring, $I^2$, that fits snugly around the shaft, and is embraced by a friction-clutch lever, $I^3$, that encircles the ring $I^2$ and fits its peripheral groove. The band portions of the lever $I^3$ are hinged together, and their free ends are supported by a loop secured to one of the spiders G. The free ends of the levers are arranged nearly parallel with each other, and are bent at right angles to form handles, which may be grasped by the engineer to gripe the ring $I^2$, and hold the valve I stationary while the shaft continues to revolve. This movement will bring the opening of the valve opposite the other port of the rim-plate and reverse the engine by admitting steam to the opposite side of the piston. When the shaft E is moved in the opposite direction and the valve is arrested in its revolution the other port will again be brought in communication with the interior of the shaft and cause the piston to again reverse its movement. When the engine is at rest the valve may be moved in either direction by griping and turning it. The engine is allowed to exhaust its steam at proper intervals without allowing a still-point or interval between the opening and closing of its valves, and also admit of the reversal of the engine by the following means:

The shell-sections $A'$ $A^2$ are each formed with a protruding interior valve-chamber, K, arranged diametrically opposite each other upon the shell-casing, provided with exhaust-openings K', communicating with exhaust-pipes $K^2$, that follow the upper surface of the shell A and connect with each other at the top of the casing, and allow the steam to escape through a single pipe, $K^3$.

The valves L are connected by a rule-joint, $l$, with the valve-seat L', and are formed of segmental blocks curved upon their face to conform to the surface of the steam-chamber when the valve is closed. When the valve is opened, as shown in the drawings, one end of the valve will project across the steam-chamber $A^3$ and form an abutment behind the piston in its revolution, against which the pressure of the steam may exert itself. The other end of the valve will project back into the valve-chamber a sufficient distance to pass the seat $K^4$ of the valve and open communication between the steam-chamber in front of the piston and the exhaust-port.

It will thus be seen that when two valves are employed one of the valves will always take the back-pressure from the other valve, so that they may be easily moved by the piston passing across their face.

The valve-seats L' are freely journaled to the hinge-pin or spindles $l'$, and are formed with two faces, $l^2$ $l^3$, one for each end of the valve L.

The valves and valve-seats L L' are turned upon their spindles $l'$ by bell-crank levers M M, connected to each of the valve-seats by a pin, $l^4$, that passes through segmental slots in the faces of the valve-casing, and the levers M M are coupled together by a rod, M', provided with a handle and locking device, by which means both of the valve-seats may be operated together, so that they may be turned upon their spindles, and either of the faces $l^2$ or $l^3$ be brought against the back of the valve to place it in position for allowing the engine to operate in either direction.

When the valve-seat L' is shifted to reverse the engine the end that bears against the wall of the valve-chamber will clear itself and allow the steam to escape behind it into the exhaust-pipe before the pressure is brought against the back of the upper end of the valve. The valve will thus be balanced and easily moved. The pressure of the steam alone will by this movement shift the valve-seat, and a locking mechanism upon the lever M and bar M' is required to hold it in position.

A simple form of locking device consists in a sliding bar, $m$, upon the outer side of the bar M', to the end of which is connected a short bell-crank lever, $m'$, that operates a pin, $m^2$, sliding through the bar $m$ and engaging with holes $m^2$ $m^3$, in the face or rim of the casing A, which are arranged at such distance apart as to hold the valve-seat in either one or the other of its positions.

The valves L are packed in the following manner: The face of the valves are recessed to receive a piece of sheet-rubber, $l^4$, that projects slightly from its edges on all sides and is held in place by a face-plate, $l^5$, and clamping-screws $l^6$. The ends of the rule-joint are covered by a rubber disk, $l^7$, perforated at its center to encircle the spindle. Each of the faces $l^2$ $l^3$ of the valve-seat is provided with a piece of sheet-rubber, $l^8$, that surrounds its edges and connects at its inner ends with the rubber disks $l^7$ around the rule-joint, and is held in place by a face-plate and clamping-screws, in a similar manner to the packing of the valve-face.

The operation of the engine will be readily understood from the foregoing description. The valves L L are first placed in position by the hand-lever M and securely held by its locking device. The valve which serves as the abutment-valve will then fall in position by its own weight. The reverse-valve L is then placed in proper position, so that when the throttle-valve is opened the steam will be admitted between the piston and the abutment-valve, and the air or steam in front of the piston will escape through the opening of the other valve. As the piston passes the valve the valve will be forced out of the steam-chamber $A^3$, to clear the way for the passage of the piston. The moment the piston has cleared the valve the steam behind it will exert itself upon the free end of the valve and open its way of escape, the opposite end of the valve being by the same means again placed across the steam-chamber and serves as an abutment for the steam behind the piston.

What I claim as new is—

1. In a rotary engine, the combination, with a shell inclosing an annular steam-chamber, of a segmental piston rotating within the chamber and connected to a concentric shaft by arms provided with a steam-port to conduct the steam at all times immediately behind the piston, and an exhaust-valve hinged within an exhaust-chamber upon the outer side of the steam-chamber in such manner that one end of the valve will project across the steam-chamber to form an abutment for the back-pressure of the steam, and the other end of the valve will be operated upon by the exhaust to open the valve and allow its escape when the valve has been closed by the piston, substantially as described.

2. In a rotary engine, the combination, with a casing inclosing an annular steam-chamber, of a segmental piston rotating within the chamber and revolving upon a concentric shaft, and exhaust-valves arranged diametrically opposite each other and operated upon directly by the piston and exhaust-steam, the one to open and the other to close the valve, in the manner substantially as described, the one valve to release the other of back-pressure while being operated upon by the piston.

3. In a rotary engine having a piston that rotates within an annular chamber, the double exhaust-valves hinged to oscillating valve-seats, the seats being coupled together and operated simultaneously to change the position of the valves and reverse the engine, substantially as described.

4. In a rotary engine, the combination, with the casing inclosing an annular steam-chamber, of the segmental piston D, rotating within the chamber and provided with rectangular pieces of sheet-rubber secured to the ends of the piston by metal plates with inclined ends bent at right angles to the face of the plates, and bolts $d'$, that clamp the packing against the end of the piston, substantially as and for the purpose described.

5. In a rotary engine, the combination, with the casing inclosing an annular steam-chamber, of the segmental piston D, rotating within the chamber, and the rim-plate C, journaled to the concentric driving-shaft and provided with a finger that passes up through the piston, the opening through the piston being smaller at its middle portion than at its ends, to allow the piston to adjust itself, substantially as and for the purpose specified.

6. In a rotary engine, the combination of the casing inclosing an annular steam-chamber, a segmental piston arranged to rotate within the chamber, and a concentric hollow driving-shaft connected with the piston by arms through which two radial ports connect the interior of the shaft with the opposite ends of the piston, and a cylindrical valve arranged to partially rotate within the shaft and provided with a single opening to admit steam to either one of the ports and close it to the other, substantially as specified.

7. The combination of the casing provided with an annular steam-chamber, the segmental piston secured to the hollow driving-shaft and arranged to rotate within the steam-chamber, the radial ports that connect the interior of the shaft with the steam-chamber at opposite ends of the piston, the cylindrical valve I, to control the opening of the ports with the interior of the driving-shaft, the grooved ring $I^2$, and a clutch-lever, $I^3$, that encircles the ring and operates the valve, substantially as and for the purpose specified.

The above specification of my invention signed by me this 13th day of May, 1880.

GEORGE W. DUDLEY.

Witnesses:
SOLON C. KEMON,
WM. H. ROWE.